(12) United States Patent  
Heym et al.

(10) Patent No.: US 6,334,627 B1  
(45) Date of Patent: Jan. 1, 2002

(54) VARIABLE-VOLUME AIR BAG FOR AN AIRBAG MODULE

(75) Inventors: Axel Heym; Harald Jahnke, both of Berlin (DE)

(73) Assignee: Takata-Petri AG, Aschaffenburg (DE)

( * ) Notice: Subject to any disclaimer, the term of this patent is extended or adjusted under 35 U.S.C. 154(b) by 0 days.

(21) Appl. No.: 09/646,694

(22) PCT Filed: Mar. 19, 1999

(86) PCT No.: PCT/DE99/00890

§ 371 Date: Nov. 17, 2000

§ 102(e) Date: Nov. 17, 2000

(87) PCT Pub. No.: WO99/48728

PCT Pub. Date: Sep. 30, 1999

(30) Foreign Application Priority Data

Mar. 20, 1998 (DE) .......................................... 198 13 832

(51) Int. Cl.⁷ ................................................. B60R 21/16
(52) U.S. Cl. .................................. 280/743.2; 280/728.1
(58) Field of Search .......................... 280/743.1, 743.2, 280/728.1

(56) References Cited

U.S. PATENT DOCUMENTS

| 5,249,825 A | 10/1993 | Gordon et al. .............. 280/743 |
| 5,362,101 A | 11/1994 | Sugiura et al. ............. 280/743 |
| 5,498,031 A | 3/1996 | Kosugi ....................... 280/743 |

FOREIGN PATENT DOCUMENTS

| DE | 296 07 302 | 8/1996 |
| DE | 297 04 975 | 8/1997 |
| DE | 297 20 461 | 4/1998 |
| GB | 2 302 845 | 2/1997 |
| JP | 03136946 | 6/1991 |
| JP | 05085295 | 4/1993 |
| JP | 07069149 | 3/1995 |

*Primary Examiner*—Eric Culbreth  
(74) *Attorney, Agent, or Firm*—Foley & Lardner (57) ABSTRACT

The invention relates to a variable-volume airbag module. According to the invention, to limit the air bag volume at least one pull element is provided for which is loosely guided at the level of the air bag and attached at its ends after the airbag has been gathered, and which is released or tears if it is subjected to a certain stress during unfolding of the air bag.

20 Claims, 9 Drawing Sheets

VARIABLE-VOLUME AIR BAG FOR AN AIRBAG MODULE

BACKGROUND OF THE INVENTION

The invention relates to a variable-volume airbag for an airbag module.

In order to obtain a certain direction of extension in the initial phase of the unfolding of the airbag or when staged generators are used, it is expedient not to unfold the entire volume of the airbag immediately. When the last-mentioned generators are used, in the event of only a substage being activated, the airbag is filled more slowly and with less gas mass. The inadequate filling of the airbag delays the buildup of membrane forces in the airbag fabric and therefore the restraining force on the occupant. The forward shifting of the occupant would be very great and it would scarcely be possible to avoid contact with the rigid interior contour.

It is therefore know to unfold the airbag in this case with a reduced volume.

U.S. Pat. No. 5,362,101 thus discloses reducing the volume of the airbag by it being partially laid in folds which are sewn together. In the first phase after ignition of the gas generator, for example after ignition of the first stage of a two-stage gas generator, the airbag is unfolded only up to the reduced volume limited by the seams. When the internal pressure is increased by ignition of the second stage, the abovementioned seams are finally torn open and the airbag can be unfolded to its full volume.

The disadvantage of reducing the volume by means of tearing seams resides in the fact that the said seams have to be torn open automatically, but because of tolerances in the fabric and also because of environmental influences (for example, temperature, air humidity), a defined and reproducible tearing open of the seams can scarcely be achieved. Furthermore, the folding of an airbag having taken-in regions and the installation in the airbag module are also problematical because the airbag is distorted because of the darts and, as a result, handling in the production process is made more difficult.

Furthermore, airbags for airbag modules are known in which catch bands are arranged in order to obtain certain directions of unfolding and in order to limit the volume in the first unfolding phase, i.e. in an intermediate stage of the unfolding. The catch bands are provided both within the airbag and outside it. They are fastened by both ends to opposite sides of the airbag and are dimensioned in such a manner that they tear off from the airbag or even burst at a predetermined internal pressure. An airbag of this type with an external catch band is disclosed, for example, in the document JP-A-07 069149.

These catch band arrangements have the same disadvantages as in the abovementioned arrangements with tearing seams.

SUMMARY OF THE INVENTION

The invention is based on the object of achieving, with a relatively small outlay, a limitation of the volume of the airbag, the intention being for the increase in size of the airbag to its maximum volume to be possible with improved reproducibility.

In the case of a variable-volume airbag for an airbag module, in order to limit the airbag volume in an intermediate stage, at least one pull element is provided which is loosely guided on the airbag and after the airbag is gathered together is secured by its ends and which can be released or torn after being subjected to a certain stress during the unfolding of the airbag. A pull cable or a rigid element can be provided as the pull element. A cord can preferably be used as the pull cable. However, the term pull cable also includes a pull band.

In the present case, the pull cable is intended to gather together the airbag in such a manner that during the unfolding in a first phase a smaller volume has to be filled with gas than in a later phase. This is of importance, for example when staged generators are used. In these staged generators, in the event of only a substage being activated, the airbag is filled more slowly and with less gas mass. In the case of an airbag having a single, large volume, this results in it being inadequately filled, which delays the buildup of membrane forces in the airbag fabric and therefore the restraining force on the occupant. The forward shifting of the occupant is very great and it is not possible to avoid contact of the occupant with the rigid interior contour.

By adapting the airbag volume or the airbag shape by means of the pull cable to the gas mass provided in each case, and therefore to the filling pressure, this disadvantageous effect of the staged generator can be compensated for.

The reduction of the airbag volume by means of a pull cable or a plurality of pull cables also has the advantage that the said cables do not have to be connected to the airbag, as is required, for example in the case of catch bands. Rather, the ends of the pull cable can also be fastened at any desired location.

After the airbag is gathered together by means of a pull cable, its ends can be secured by being connected to one another. The pull cable then surrounds the gathered-together region of the airbag without being connected thereto. The reproducibility of the increase in size of the airbag volume is only influenced by the pull cable itself, but not by the airbag fabric and seams provided thereon. The airbag volume can be increased in size at a predetermined stress by the separation of the ends of the pull cable or by the tearing of the pull cable.

A further possibility of securing the ends of the pull cable resides in fastening at least one end in the housing of the airbag module. This results in further possibilities of releasing the pull cable by separately arranged mechanisms being provided for the release of at least one end. As a result, the reproducibility of the increase in size of the airbag volume can be increased further, since now even the strength of the pull cable which slightly fluctuates from specimen to specimen has no influence.

For the release at least of one end of the pull cable, for example, thermal or mechanical mechanisms can be provided or a detonating cap can also be provided.

The airbag can be gathered together by means of the pull cable in such a manner that it is partially constricted or is subdivided into chambers. In the last mentioned case, the pull cable lies over an angular range of at least 360° around the airbag.

The pull cable is generally guided such that it bears closely against the airbag in guide elements. For example, tabs, rings or flexible tubes can be used as these guide elements.

The pull cable can be provided on the outside and/or inside of the airbag.

On the one hand, the pull cable can preferably be provided in regions of the airbag with which the occupant does not have contact after the unfolding of the airbag. This definitely rules out the possibility of the occupant being injured by an external pull cable after the latter has been torn off. On the other hand, a pull cable or a plurality of pull cables can be provided in different regions of the airbag in order to influence both the size and the shape of the airbag in the first phase of the unfolding.

Provision is made in one embodiment for a pull cable to extend over a predetermined length of the airbag at a constant distance from the edge of the blow-in mouth of the airbag, and for the two ends to be fastened in the housing of the airbag module. However, it is also possible for the guide elements to be provided alternating at a different distance from the blow-in mouth of the airbag, so that the pull cable runs in a zigzag shape.

In a further embodiment, starting from a first circumferential pull cable, at least one second pull cable is provided which runs in the direction of the blow-in mouth essentially perpendicularly with respect to the first pull cable.

In another embodiment, at least one eyelet is provided on the airbag for the guiding of the pull element.

In this embodiment, at least one pull cable can be provided which is connected fixedly to the airbag housing by one end, runs through the eyelet and is fastened by the other end in a retaining device which opens at a predetermined pressure.

In another refinement, at least one pull element is provided which is connected fixedly to the airbag housing by one end and whose other end is provided with a hook which engages in the eyelet and bends up at a certain tensile stress.

The invention will be explained in exemplary embodiments with reference to drawings, in which:

DETAILED DESCRIPTION OF THE INVENTION

Figure 1:
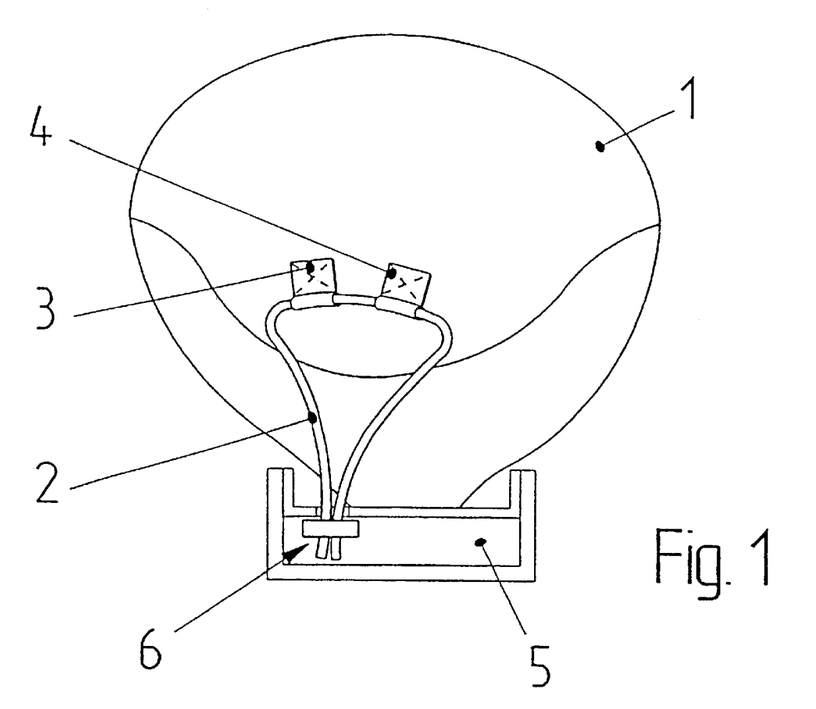
FIG. 1 shows a side view of an unfolded airbag which is limited in its extension by means of a cord.

FIG. 1 illustrates an airbag 1 in which a pull cable is arranged on the outside in the form of a cord 2 which is guided loosely on the airbag 1 in two tabs 3, 4. The airbag is partially gathered together by means of the cord 2 and its ends are fastened in an airbag housing 5 in a retaining device 6. In the first phase of the unfolding, the cord prevents the airbag from stretching out to its full size.

Figure 2:
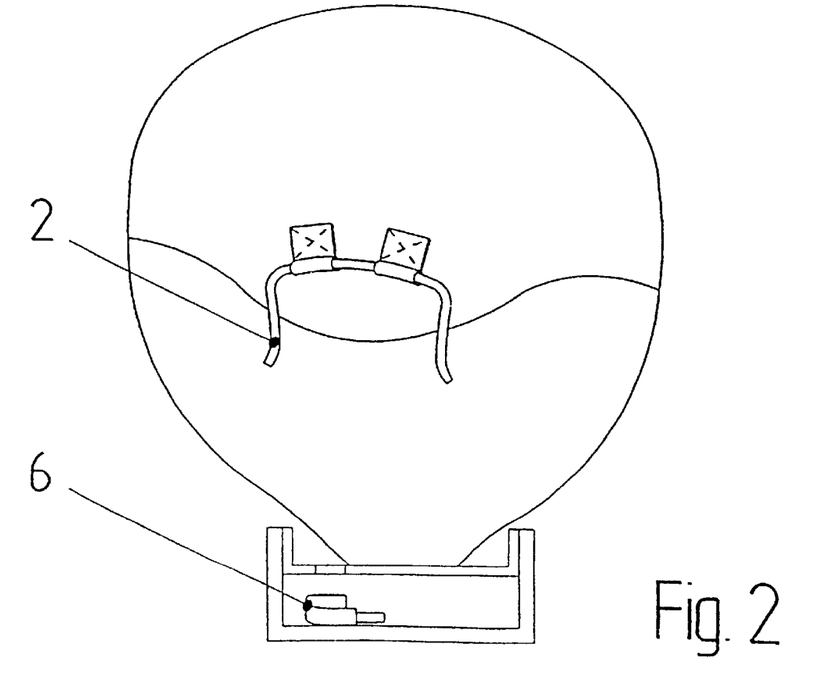
FIG. 2 shows the airbag according to FIG. 1 after the release of the cord.

When there is a further rise in the pressure in the airbag, the ends of the cord are released from the retaining device, and the airbag can unfold to its full size, as is illustrated in FIG. 2.

Figure 3:
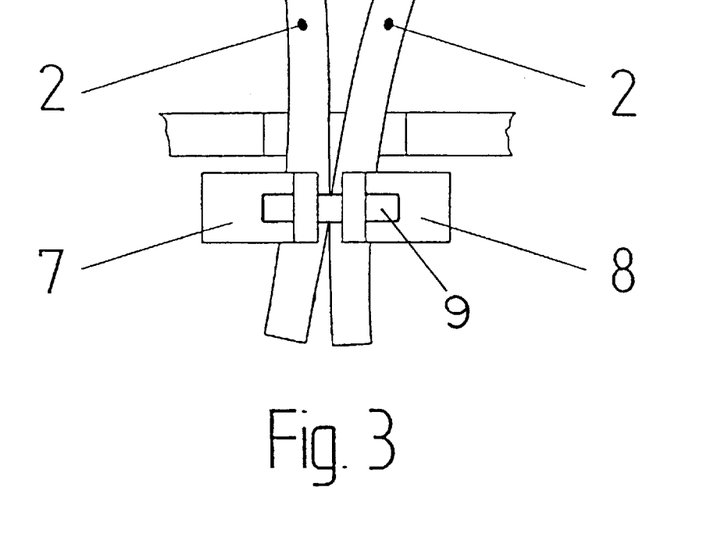
FIG. 3 shows a fastening device for the ends of the cord in a side view.
Figure 4:
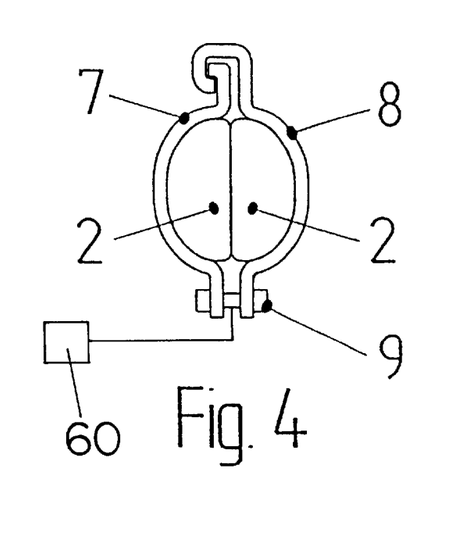
FIG. 4 shows the device according to FIG. 3 in a plan view.
Figure 5:
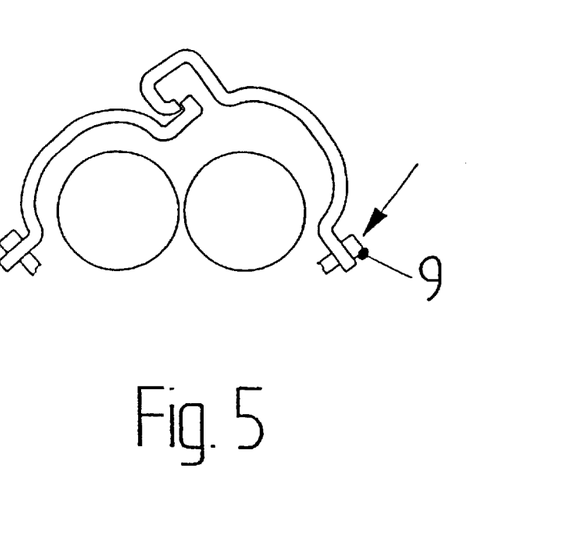
FIG. 5 shows the device of FIGS. 3 and 4 after release of the ends of the cord.

FIGS. 3 to 5 illustrate an exemplary embodiment of a retaining device. The latter consists of two clips 7, 8 which are hooked together at one end and are connected to each other at the other end by means of a snap stud 9. This retaining device enables active volume adaptation, for example in conjunction with a multistage gas generator, since the time of destruction of the snap stud and therefore the release of the cord can be selected as desired. A separately activated mechanism 60, such as thermal or mechanical mechanisms or a detonating cap may be used to release the pull cable. FIG. 5 shows that the clips 7, 8 unfold after destruction of the snap stud and release the ends of the cord 2.

Figure 6:
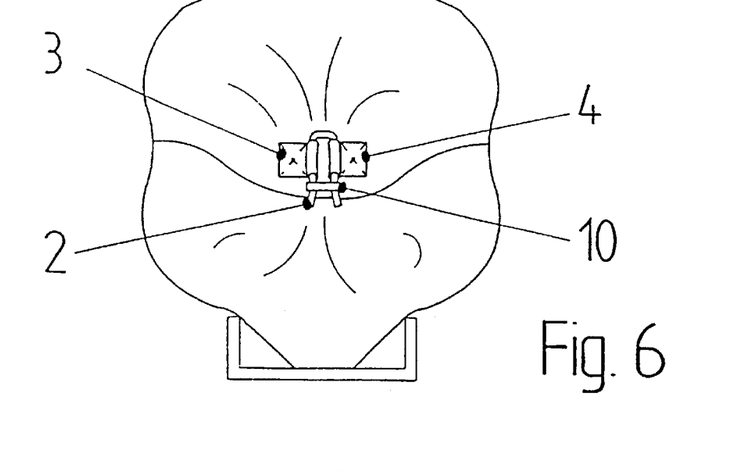
FIG. 6 shows a side view of an unfolded airbag with a second embodiment of a fastening device for the ends of the cord.
Figure 7:
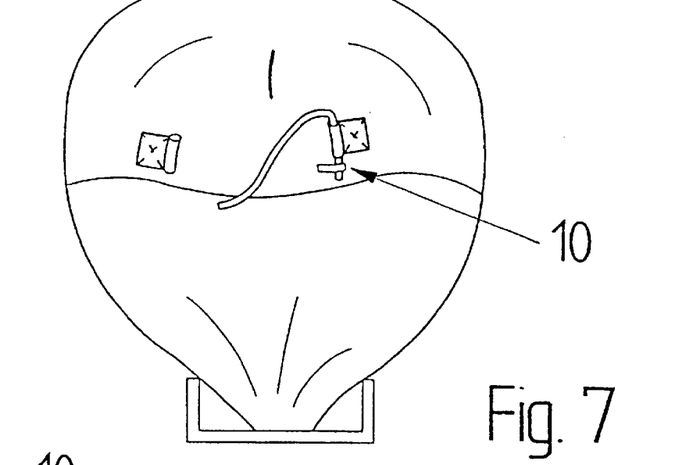
FIG. 7 shows the airbag according to FIG. 6 after release of the cord end.
Figure 8:
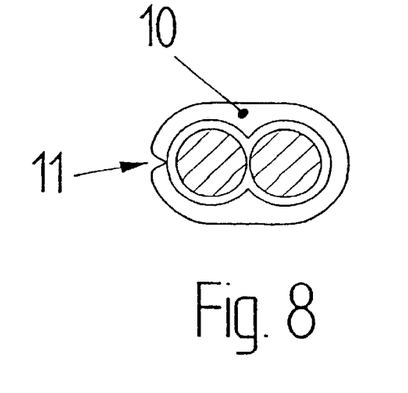
FIG. 8 shows the fastening device used in the exemplary embodiment of FIG. 6, in a plan view.
Figure 9:
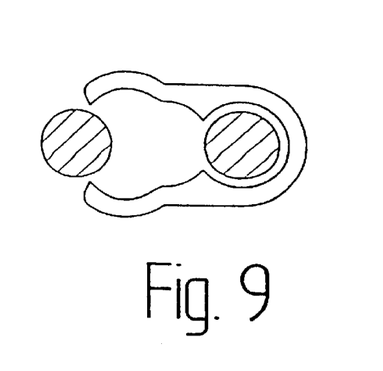
FIG. 9 shows the fastening device according to FIG. 8 after release of the ends of the cord.

In the exemplary embodiment of FIG. 6, the airbag is likewise partially gathered by a cord 2, which is guided in tabs 3, 4. However, in this exemplary embodiment, the ends of the cord are fastened in a clamp 10 directly below the tabs 3, 4. The said clamp has a predetermined breaking point 11 (FIG. 8) which breaks open (FIG. 9) at a certain internal pressure of the airbag. In FIG. 6, the airbag has unfolded as far as the secured cord allows it to. After the clamp is broken open, the airbag can be unfolded to its full size, as is illustrated in FIG. 7. In this exemplary embodiment, only passive volume adaptation as a function of the internal pressure of the airbag is possible.

Figure 10:
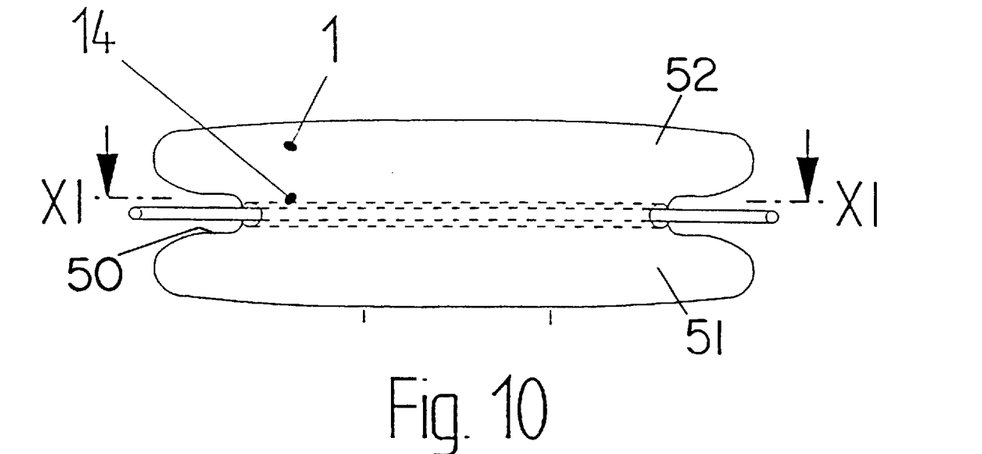
FIG. 10 shows the side view of an unfolded airbag which has a cord wrapped around it parallel to the edge of the blow-in mouth.
Figure 11:
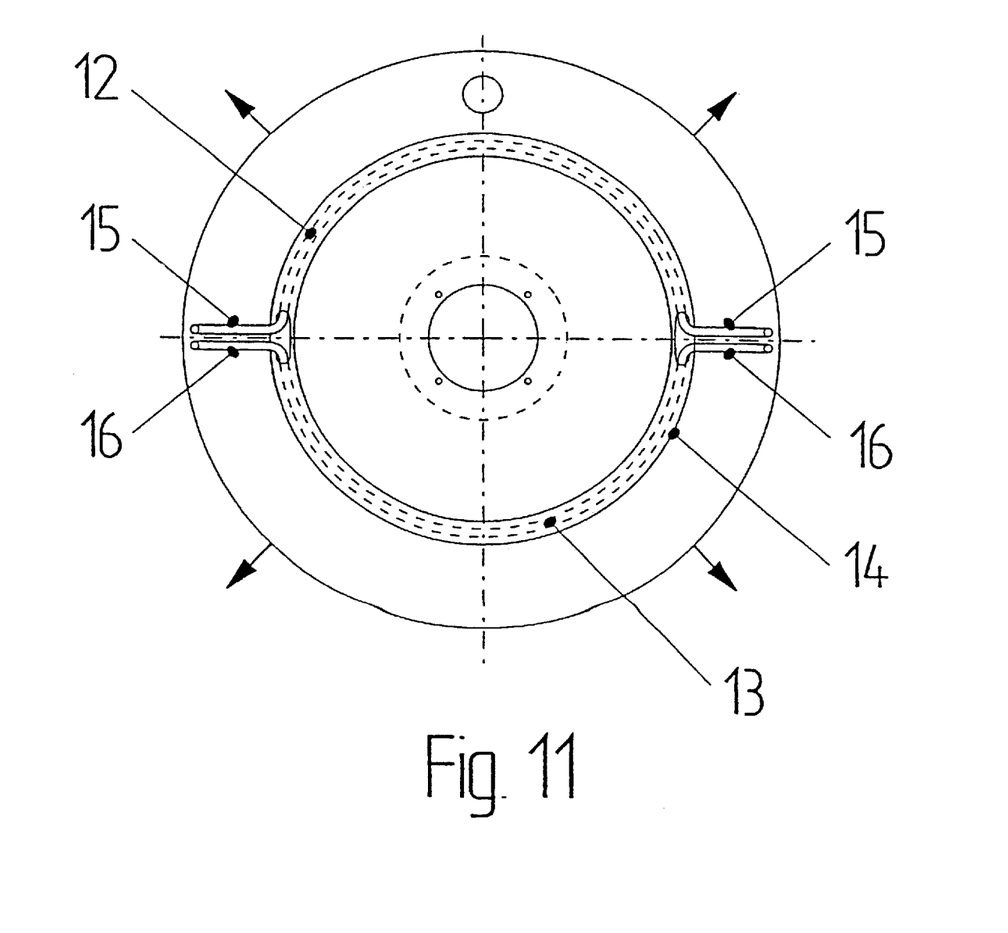
FIG. 11 shows a section through the airbag according to FIG. 10, as seen in the direction of the arrows XI—XI.

In the exemplary embodiment of FIGS. 10 and 11, two cords 12, 13 are guided in a flexible tube 14 in the interior of the airbag. Each of the cords extends over half of the circumference of the airbag and the ends 15, 16 of the cords are guided outwards out of the airbag. They can be secured by means of one of the previously illustrated devices after the airbag has been gathered together.

By means of the cords the airbag is partially constricted together at 50 in the illustration of FIGS. 10 and 11 and it assumes the illustrated shape in the initial phase of the unfolding forming chambers 51, 52. After the release of the cords it unfolds completely.

Figure 12:
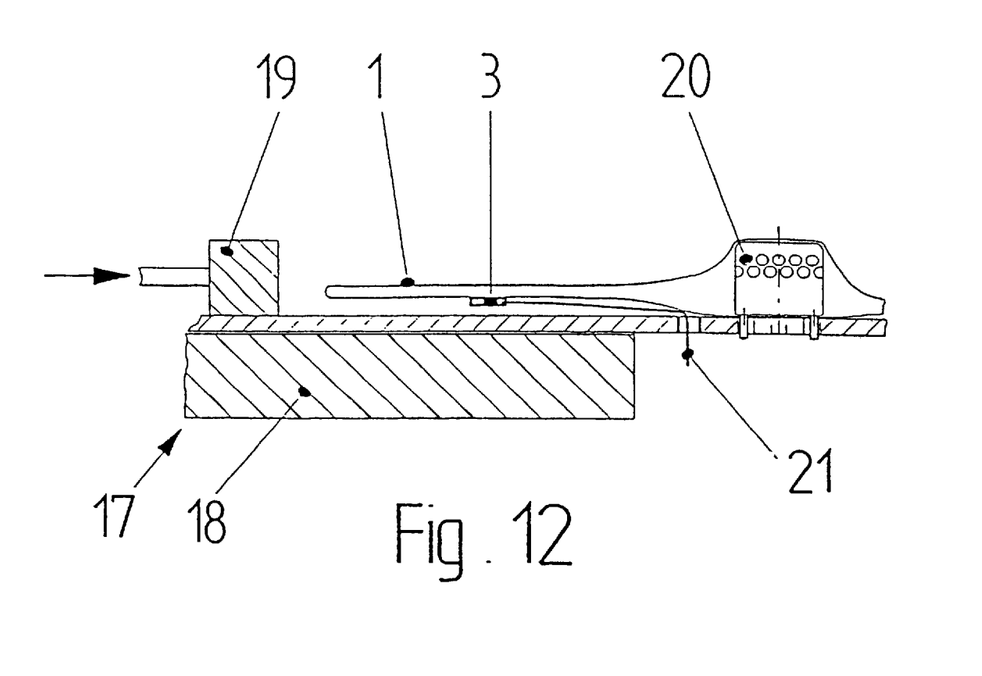
FIG. 12 shows a section through an extended airbag with a cord provided on the outside of the airbag.
Figure 13:
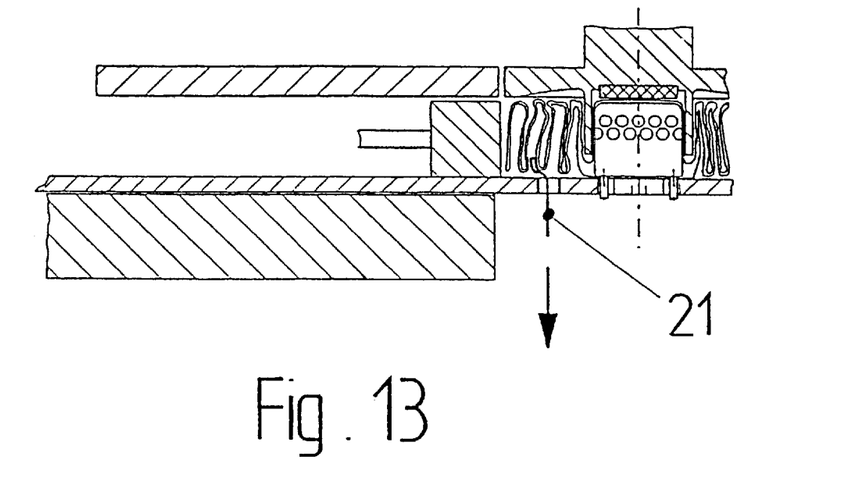
FIG. 13 shows the airbag according to FIG. 12 in a folded position.

In FIGS. 12 and 13, a folding device 17 is illustrated schematically. This folding device has a baseplate 18 with a folding tool 19. In FIG. 12, the said tool is in a starting position, so that the extended airbag 1 can be held with a gas generator 20 already fitted. Tabs are provided which are fastened on the outside of the airbag and of which only one tab 3 can be seen. A cord 21 is guided in the tabs, this cord being wrapped around half of the airbag, similarly to FIG. 11, but it is also possible for it to be wrapped completely around the airbag. One end of the cord is guided outwards through the baseplate 18. The other end, which is likewise guided outwards, is not illustrated.

In the folding of the airbag, as is illustrated in FIG. 13, the cord 21 is pulled downwards out of the baseplate 18 and is fastened after the end of the folding procedure, during the installation of the airbag in the airbag housing, for example in the manner set out in the first exemplary embodiment.

Figure 14:
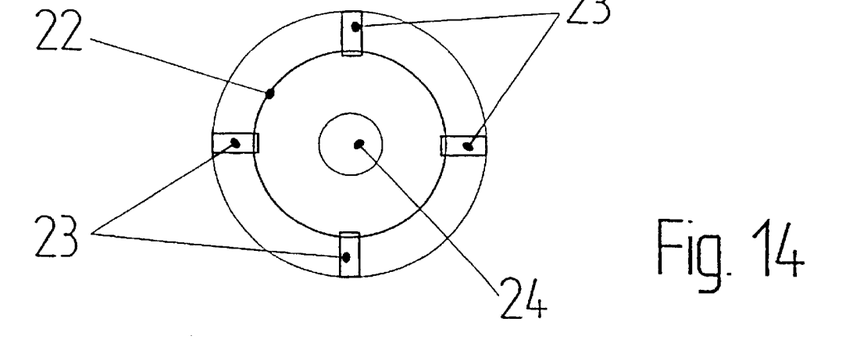
FIG. 14 shows the schematic illustration of an airbag with a cord guided in four tabs which lie on a radius.

FIG. 14 again schematically illustrates the arrangement of a cord 22 guided in four tabs 23. In this arrangement, the tabs are situated at the same distance from the blow-in mouth 24.

Figure 15:
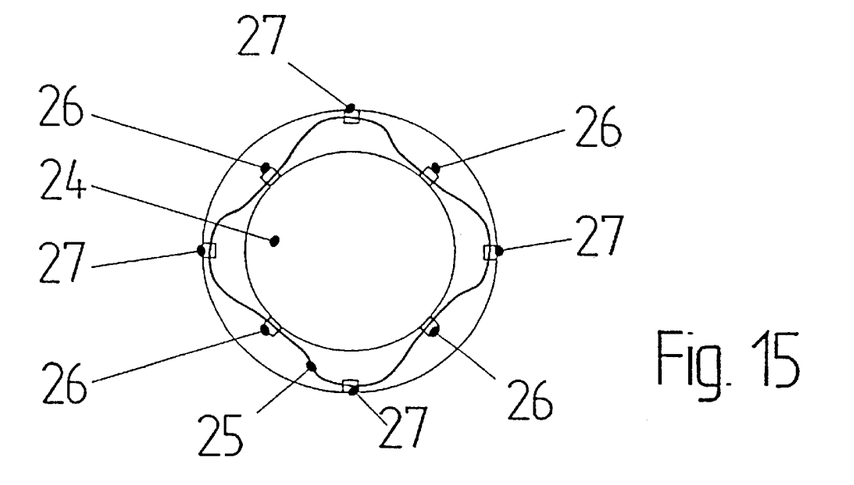
FIG. 15 shows the schematic illustration of an airbag with a cord guided in eight tabs, with four tabs each lying on different radii.

In the exemplary embodiment of FIG. 15, a cord 25 is guided in eight tabs. In this case, four tabs 26 are arranged at a smaller distance from the blow-in mouth 24 than the other four tabs 27. The cord therefore runs in a zigzag shape in this embodiment.

Figure 16:
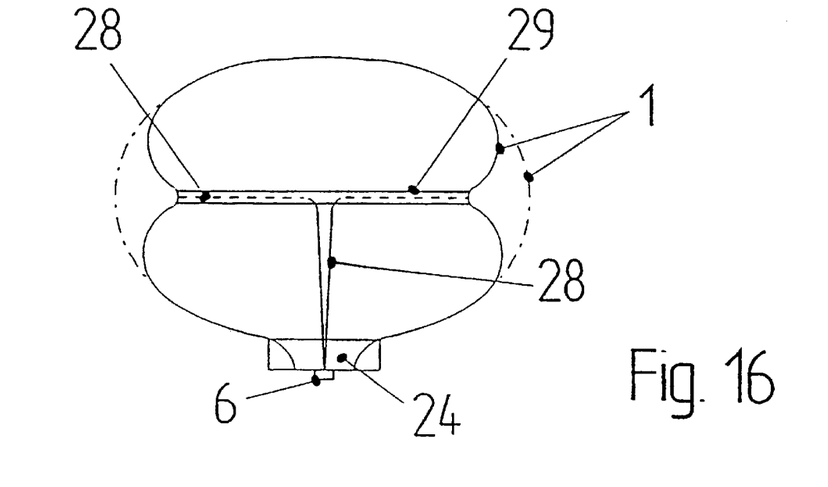
FIG. 16 shows a side view of an unfolded airbag with a circumferential cord.

In the exemplary embodiment of FIG. 16, a circumferential cord 28 in a flexible tube-shaped guide 29 is provided, the ends of the said cord being guided to the blow-in mouth 24 of the airbag and being fastened there in the retaining device 6. The figure shows the airbag in the first phase of the unfolding, in which the airbag volume is limited by the cord 28. The dashed-dotted line shows the airbag in its full size after the release of the cord.

Figure 17:
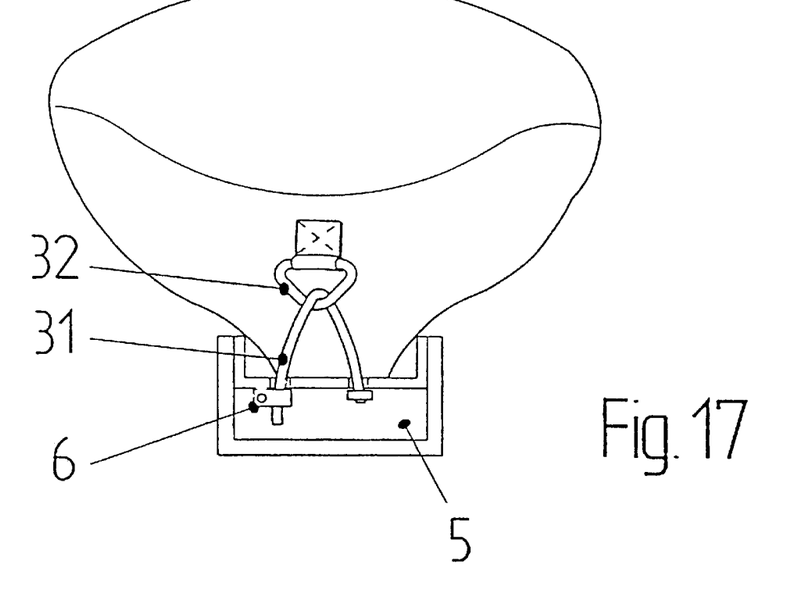
FIG. 17 shows a side view of an unfolded airbag with a cord which is connected fixedly to the airbag module.

In the exemplary embodiment of FIG. 17, a cord 31 is provided which is connected fixedly to the airbag housing 5 by one end. The cord is guided through an eyelet 32 coupled to the airbag and is fastened in the airbag housing 5 by its other end, by means of the retaining device 6 which has already been described previously. This cord also prevents the airbag from extending to its full size in the first phase of the unfolding.

Figure 18:
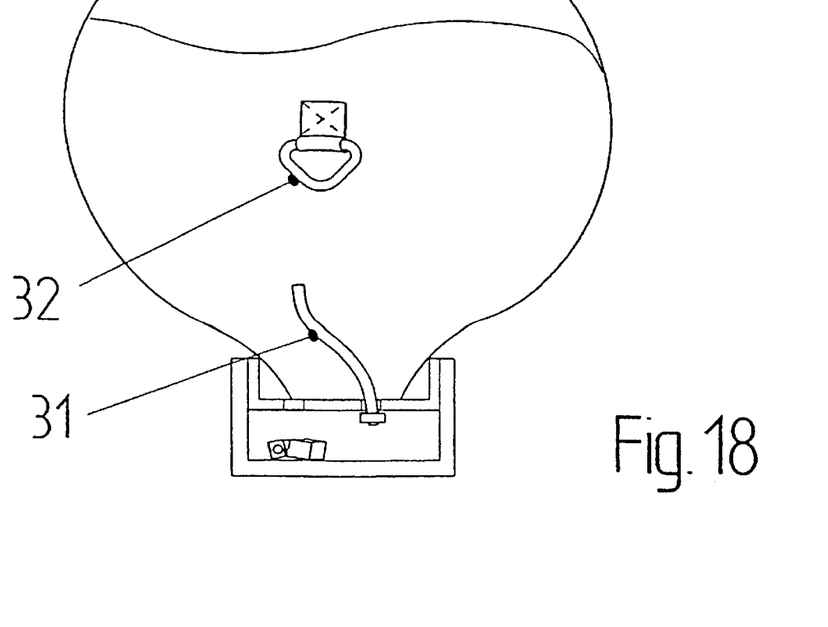
FIG. 18 shows the airbag according to FIG. 17 after the release of the cord.

When there is a further rise in the pressure in the airbag, that end of the cord 31 which is fastened in the retaining device is released, and the airbag can be unfolded to its full size, as is illustrated in FIG. 18. In this case, the cord 31 is pulled out of the eyelet 32 and remains fixedly connected to the airbag housing 5 by one end. In this exemplary embodiment, there are therefore no free cord ends hanging on the airbag, which avoids to an increased extent the occupant coming into contact with the cord.

Figure 19:
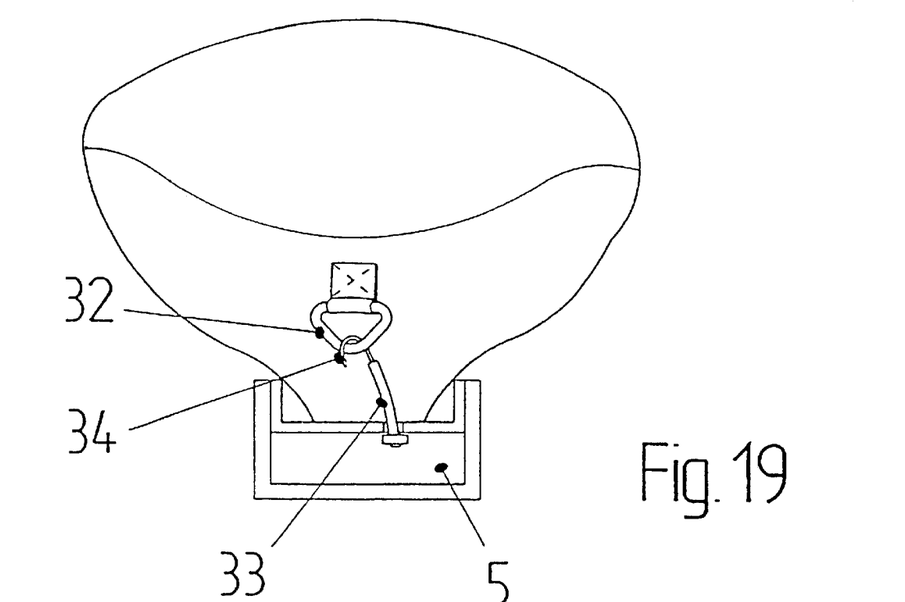
FIG. 19 shows a side view of an unfolded airbag with a hook at one end of a cord.

In the exemplary embodiment of FIG. 19, a cord 33 is provided which is connected fixedly to the airbag housing 5 by one end and at the other end has a hook 34. The latter engages in the eyelet 32, as can be seen in FIG. 19. In this manner, the full unfolding of the airbag is likewise prevented.

Figure 20:
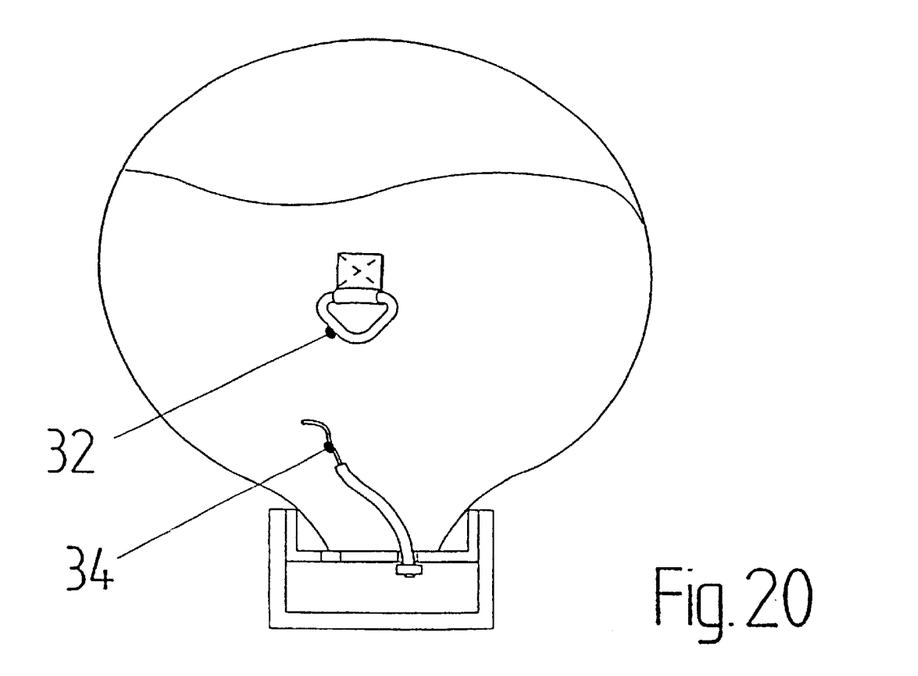
FIG. 20 shows the airbag according to FIG. 19 after the release of the cord.

The hook 34 is configured in such a manner that when there is a further increase in the pressure in the airbag, it bends up and slips out of the eyelet, so that the airbag can be unfolded fully, as is illustrated in FIG. 20.

Figure 21:
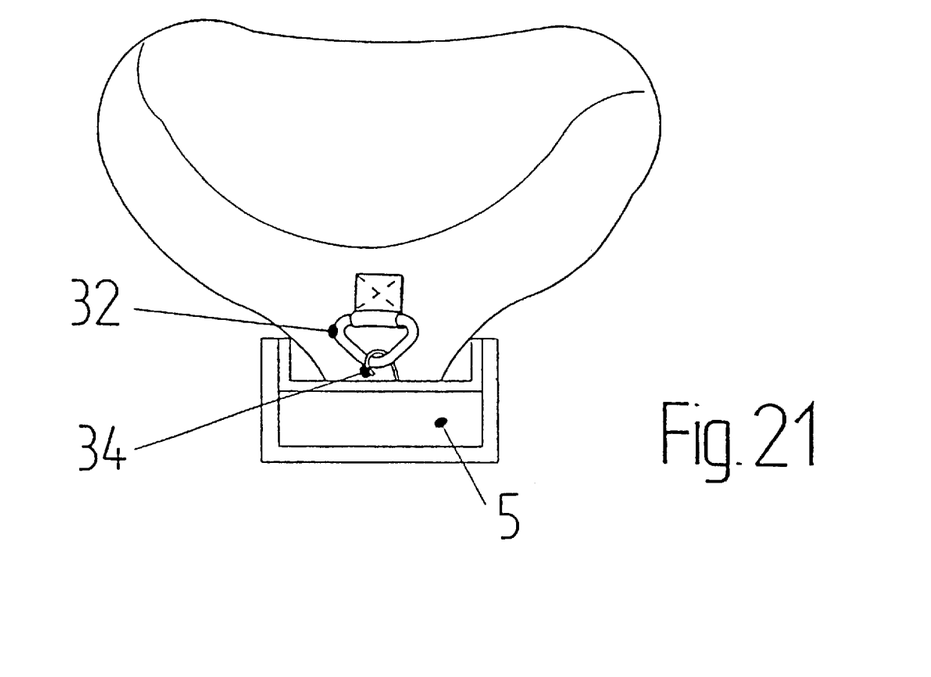
FIG. 21 shows a side view of an unfolded airbag with a hook as a pull element.
Figure 22:
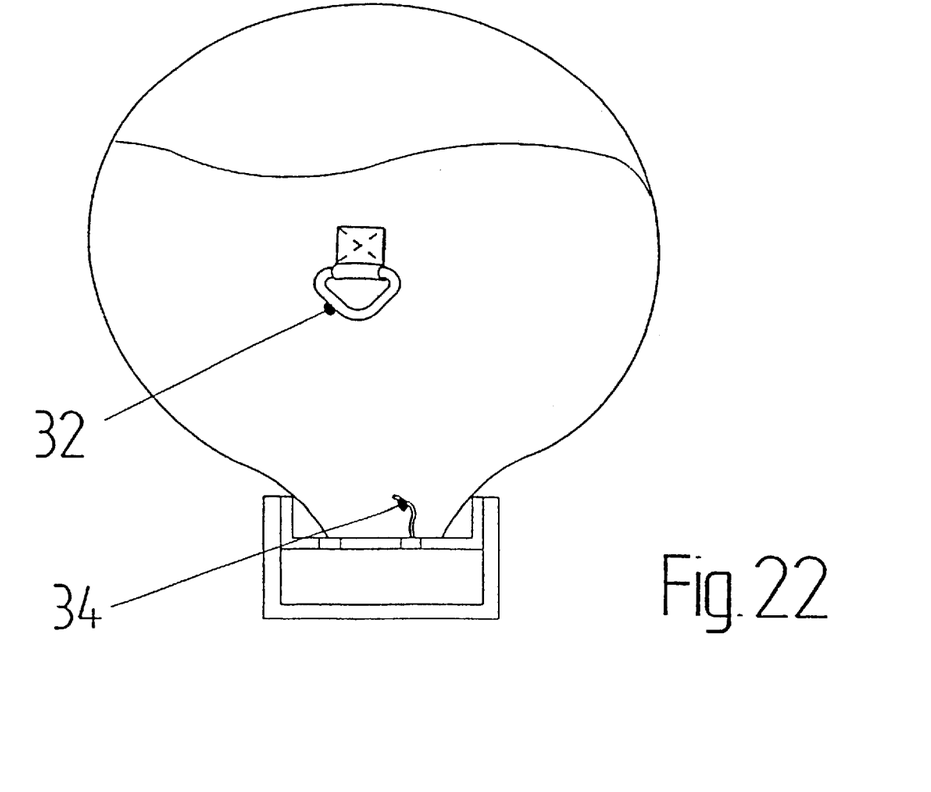
FIG. 22 shows the airbag according to FIG. 21 after the release of the hook from the associated eyelet.

In the exemplary embodiment of FIG. 21, a hook 34 is provided as a rigid pull element that engages in the eyelet 32 and in this manner prevents the complete unfolding of the airbag. As in the preceding exemplary embodiment, at a predetermined internal pressure of the airbag the hook bends up, so that it slips out of the eyelet and releases the airbag, as is illustrated in FIG. 22.

What is claimed is:

1. A variable-volume airbag for an airbag module which limits the airbag volume in an intermediate stage of unfolding, comprising:

an airbag which is gathered together and a pull element with ends which is loosely guided on the airbag and is secured by its ends and which can be unsecured after being subjected to a certain stress during the unfolding of the airbag.

2. The airbag according to claim 1, wherein the pull element is one of a pull cable or a rigid element.

3. The airbag according to claim 2, wherein the pull cable is a cord.

4. The airbag according to claim 2 or 3, wherein the ends of the pull element are connected to one another when the airbag is gathered.

5. The airbag according to claim 2 further comprising a housing for an airbag module, wherein at least one end of the pull element is fastened in the housing of the airbag module.

6. The airbag according to claim 5, wherein that end of the pull element which is fastened in the housing can be released by a separately activated mechanism.

7. The airbag according to claim 5 wherein that end of the pull element which is fastened in the housing is released by a thermal mechanism.

8. The airbag according to claim 5, wherein that end of the pull element which is fastened in the housing is released by a mechanical mechanism.

9. The airbag according to claim 5, wherein that end of the pull cable which is fastened in the housing is released by a detonating cap.

10. The airbag according to claim 2, wherein the airbag is gathered together by means of the pull element in such a manner that it is ay least one of partially constricted and subdivided into chambers.

11. The airbag according to claim 2 further comprising a guide element, wherein the pull element is guided in the guide element and bears closely against the airbag.

12. The airbag according to claim 11 further comprising a plurality of guide elements, wherein the airbag has a blow-in mouth and the guide elements alternate at different distances from the blow-in mouth of the airbag.

13. The airbag according to claim 2 further comprising a guide element, wherein the pull element is guided in the guide element and the guide element is at least one of tabs, rings and flexible tubes.

14. The airbag according to claim 2, wherein the pull element is on one of the outside and the inside of the airbag.

15. The airbag according to claim 2, wherein the pull element is in regions of the airbag with which the occupant does not have contact after the unfolding of the airbag.

16. The airbag according to claim 2, wherein the airbag has a blow-in mouth and the pull element extends over a predetermined length of the airbag at a constant distance from an edge of the blow-in mouth of the airbag, and wherein the two ends of the pull element are fastened in an airbag housing.

17. The airbag according to claim 2 which comprises a pull cable having a circumferential portion, wherein the airbag has a blow-in mouth and wherein another portion of the pull cable runs in the direction of the blow-in mouth essentially perpendicularly with respect to the circumferential portion.

18. The airbag according to claim 2 further comprising at least one eyelet for guiding the pull element, wherein the at least one eyelet is on the airbag.

19. The airbag according to claim 18 further comprising an airbag housing and a retaining device which opens at a predetermined pressure, wherein at least one pull element is connected fixedly to the airbag housing by one end, runs through the eyelet and is fastened by the other end in the retaining device.

20. The airbag according to claim 18 wherein at least one pull element is connected fixedly to the airbag housing by one end and whose other end has a hook which engages in the eyelet and bends at a certain tensile stress.

* * * * *